United States Patent
Yu et al.

(10) Patent No.: US 12,003,702 B2
(45) Date of Patent: *Jun. 4, 2024

(54) METHODS OF VIDEO PICTURE CODING WITH SUB-BLOCK MERGE SIMPLIFICATION AND RELATED APPARATUSES

(71) Applicant: Telefonaktiebolaget LM Ericsson (publ), Stockholm (SE)

(72) Inventors: Ruoyang Yu, Täby (SE); Kenneth Andersson, Gävle (SE); Du Liu, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/846,123

(22) Filed: Jun. 22, 2022

(65) Prior Publication Data
US 2022/0321878 A1    Oct. 6, 2022

Related U.S. Application Data

(63) Continuation of application No. 16/635,196, filed as application No. PCT/SE2019/051177 on Nov. 20, 2019, now Pat. No. 11,381,807.
(Continued)

(51) Int. Cl.
*H04N 19/105*    (2014.01)
*H04N 19/11*    (2014.01)
(Continued)

(52) U.S. Cl.
CPC ........... *H04N 19/105* (2014.11); *H04N 19/11* (2014.11); *H04N 19/159* (2014.11);
(Continued)

(58) Field of Classification Search
None
See application file for complete search history.

(56) References Cited

U.S. PATENT DOCUMENTS 9,736,472 B2    8/2017    Wu et al.
9,762,904 B2    9/2017    Chen et al.
(Continued)

FOREIGN PATENT DOCUMENTS

CN    103891290 A    6/2014
EP    2725800 A2    4/2014
(Continued)

OTHER PUBLICATIONS

Wang et al. "CE4-related: Simplification of ATMVP candidate derivation", Joint Video Experts Team (JVET) of ITU-T SG 16 WP 3 and ISO/IEC JTC 1/SC 29/WG 11, 12th Meeting: Macao, CN, Oct. 3-12, 2018, JVET-L0198_r2 (Year: 2018).*
(Continued)

*Primary Examiner* — Xiaolan Xu
(74) *Attorney, Agent, or Firm* — Sage Patent Group (57) ABSTRACT

There are provided mechanisms for temporal motion vector prediction of a current picture in a series of pictures of a video sequence. The method comprises determining, for a current block of the current picture, whether any one of: left, top, top-right and left-bottom spatial neighboring blocks of the current block in the current picture uses a collocated picture as a reference picture. The method further comprises, when the determination is that one of the left, top, top-right and left-bottom spatial neighboring block uses a collocated picture as a reference picture, using a motion vector of the one of the spatial neighboring blocks as a temporal vector of the current block.

12 Claims, 8 Drawing Sheets

Related U.S. Application Data (60) Provisional application No. 62/770,449, filed on Nov. 21, 2018.

(51) Int. Cl.
    *H04N 19/159*     (2014.01)
    *H04N 19/172*     (2014.01)
    *H04N 19/176*     (2014.01)
    *H04N 19/52*     (2014.01)

(52) U.S. Cl.
    CPC ......... *H04N 19/172* (2014.11); *H04N 19/176* (2014.11); *H04N 19/52* (2014.11)

(56) References Cited

U.S. PATENT DOCUMENTS

| | | |
|---|---|---|
| 2016/0366435 A1 | 12/2016 | Chien et al. |
| 2017/0054997 A1 | 2/2017 | Lin |
| 2017/0238005 A1 | 8/2017 | Chien et al. |
| 2017/0289566 A1 | 10/2017 | He et al. |
| 2017/0332099 A1 | 11/2017 | Lee et al. |
| 2018/0295380 A1 | 10/2018 | Chiu et al. |
| 2019/0020897 A1 | 1/2019 | Kim et al. |
| 2019/0313112 A1 | 10/2019 | Han et al. |
| 2020/0288166 A1 | 9/2020 | Robert et al. |
| 2021/0185338 A1* | 6/2021 | Xiu ................ H04N 19/105 |

FOREIGN PATENT DOCUMENTS

| | | |
|---|---|---|
| WO | 2017197126 A1 | 11/2017 |
| WO | 2018052986 A1 | 3/2018 |

OTHER PUBLICATIONS

International Search Report and Written Opinion of the International Searching Authority for PCT International Application No. PCT/SE2019/051177 dated Feb. 19, 2020, 14 pages.
Bross et al., "Versatile Video Coding (Draft 2)," Document: JVET-K1001-v6, Joint Video Experts Team (JVET) of ITU-T SG 16 WP 3 and ISO/IEC JTC 1/SC 29/WG 11, 11th Meeting: Ljubljana, SL, Jul. 10-18, 2018, 139 pages.
Wang et al., "CE4-related: Simplification of ATMVP candidate derivation," Document: JVET-L0198_r2, Joint Video Experts Team (JVET) of ITU-T SG 16 WP 3 and ISO/IEC JTC 1/SC 29/WG 11, 12th Meeting: Macao, CN, Oct. 3-12, 2018, 5 pages.
Yu et al., "CE2-related: ATMVP simplification" Document: JVET-M0116, Joint Video Experts Team (JVET) of ITU-T SG 16 WP 3 and ISO/IEC JTC 1/SC 29/WG 11, 13th Meeting: Marrakech, MA, Jan. 9-18, 2019, 5 pages.
Examination Report dated Mar. 2, 2022 for Indian Patent Application No. 202147027017, 5 pages.
Extended European Search Report, European Patent Application No. 19886547.9, dated Jan. 20, 2022, 12 pages.
First Office Action for Chinese Patent Application No. 201980076670.2 dated Oct. 21, 2023, 9 pages.
Hearing Notice for Indian Patent Application No. 202147027017 mailed Jan. 11, 2024, 2 pages.

* cited by examiner

| HMVP 0 | HMVP 1 | HMVP 2 | HMVP 3 | HMVP 4 | HMVP 5 |
|---|---|---|---|---|---|
| MV = (0, -1) | MV = (2, 2) | MV = (1, 0) | MV = (-2, 1) | MV = (4, 5) | MV = (6, 2) |

METHODS OF VIDEO PICTURE CODING WITH SUB-BLOCK MERGE SIMPLIFICATION AND RELATED APPARATUSES

CROSS REFERENCE TO RELATED APPLICATIONS

This application is a continuation of U.S. patent application Ser. No. 16/635,196, filed on Jan. 30, 2020, which itself is a 35 U.S.C. § 371 national stage application of PCT International Application No. PCT/SE2019/051177, filed on Nov. 20, 2019, which itself claims priority to U.S. Provisional Application No. 62/770,449 filed Nov. 21, 2018, the disclosure and content of which are incorporated herein by reference in their entireties.

The present disclosure relates generally to video picture coding.

BACKGROUND

Picture and Blocks

A video sequence is a series of pictures. Each picture may be identified with a picture order count (POC) value. The difference between two POC values can be used as a measurement of the temporal distance between two pictures.

In video coding, pictures are split into small blocks as base units for prediction and residual coding. A block may contain one two-dimensional array of samples or pixels. In a current test model (VTM) for the next video coding standard Versatile video coding (VVC), the blocks may be square or rectangular and have a size of 4×4 up to 128×128, although other sizes may be used herein.

Intra Prediction

Intra prediction, also known as spatial prediction, operates to predict a block using the previous decoded blocks within the same picture. Samples from the previously decoded blocks within the same picture are used to predict the samples inside the current block.

A picture consisting of only intra-predicted blocks is referred to as an intra picture.

Inter Prediction

Inter prediction, also known as temporal prediction, predicts blocks of the current picture using blocks from previously decoded pictures. The samples from blocks in the previously decoded pictures are used to predict the samples inside the current block. A picture that allows inter-predicted block is referred to as an inter picture. The previous decoded pictures used for inter prediction are referred to as reference pictures.

Figure 1:
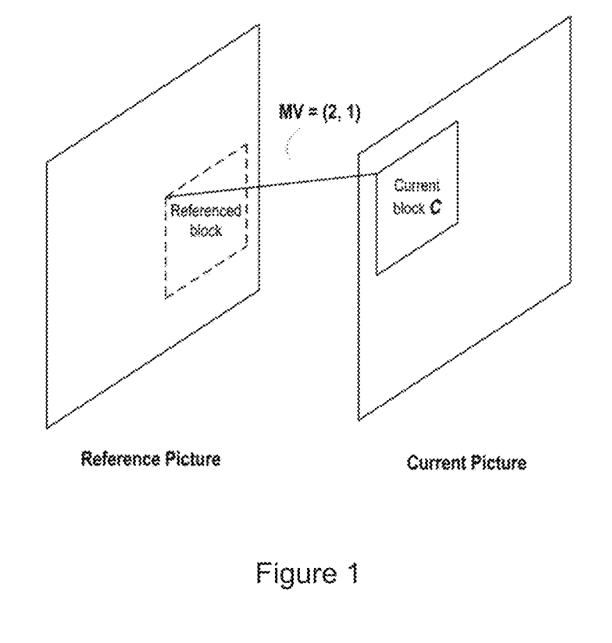
FIG. 1 shows an example MV for a current block C.

The location of the referenced block inside the reference picture is indicated using a motion vector (MV). Each MV consists of x and y components which represents the displacements between current block and the referenced block in x or y dimension. The value of a component may have a resolution finer than an integer position. When that is the case, a filtering (typically interpolation) is done to calculate values used for prediction. FIG. 1 shows an example MV for a current block C.

An inter picture may use several reference pictures. The reference pictures are usually put into two reference picture lists, L0 and L1. The reference pictures that display before the current picture are typically the first pictures in L0. The reference pictures that display after the current picture are typically the first pictures in L1.

Figure 2:
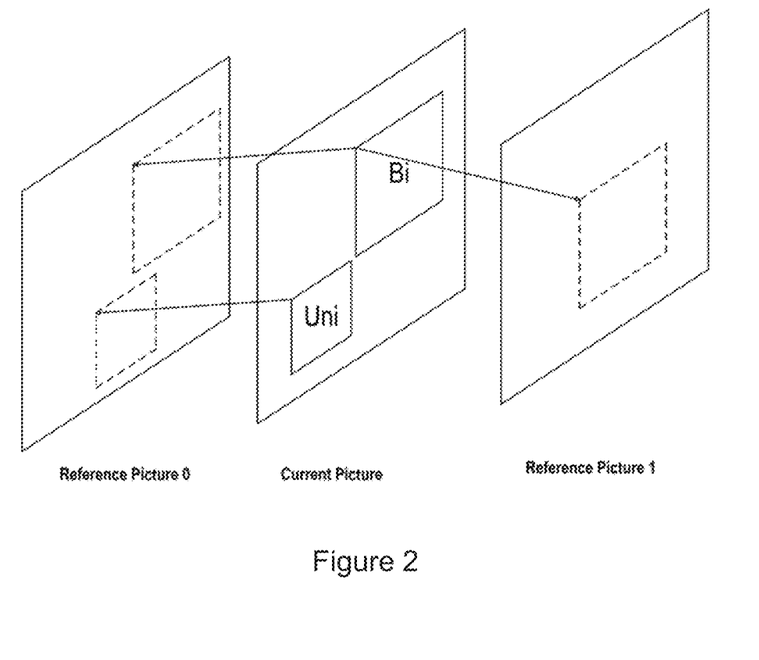
FIG. 2 shows example picture block prediction operations for uni-prediction and bi-prediction.

Inter predicted blocks can use one of two prediction types, uni- and bi-prediction. Uni-predicted block predicts from one reference picture, either using L0 or L1. Bi-prediction predicts from two reference pictures, one from L0 and the other from L1. FIG. 2 shows example picture block prediction operations for uni-prediction and bi-prediction.

Motion Vector Scaling Process

A motion vector is associated with one reference picture. Motion vector scaling operations generate a new motion vector associate with another reference picture. For example, a block in a current picture (with POC0) has a motion vector MV1 which is associated with the reference picture RefPic1 (with POC1). There is another reference picture RefPic2 (with POC2). A new motion vector MV2 associate with RefPic2 can be generated by scaling the MV1's x and y components according to the temporal distances (POC2−POC0) and (POC1−POC0):

$$MV2\cdot x = MV1\cdot x * (POC2-POC0)/(POC1-POC0)$$

$$MV2\cdot y = MV1\cdot y * (POC2-POC0)/(POC1-POC0)$$

Inter Prediction/Motion Information

For an inter block inside an inter picture, its inter prediction information may consist of the following three elements:
 a) A reference picture list flag (RefPicListFlag) that signals which reference picture list is used.
   When the value of the flag equals to 0, it means L0 is used. When the value of the flag equals to 1, it means L1 is used. When the value of the flag equals to 2, it means both L0 and L1 are used.
 b) A reference picture index (RefPicIdx) per reference picture list used. The index signals which reference picture inside the reference list to be used.
 c) A motion vector (MV) per reference picture used to signal the position inside the reference picture that is used for predicting the current block.

The inter prediction information can also be referred to as motion information. The motion information can be stored in each inter block. In other words, an inter block maintains its own motion information.

Motion Information Signaling

The current VVC includes several methods of signaling motion information for each block: block merge and sub-block merge. These methods use the motion information in other blocks to predict the motion information for a current block.

Block Merge Method

Figure 3:
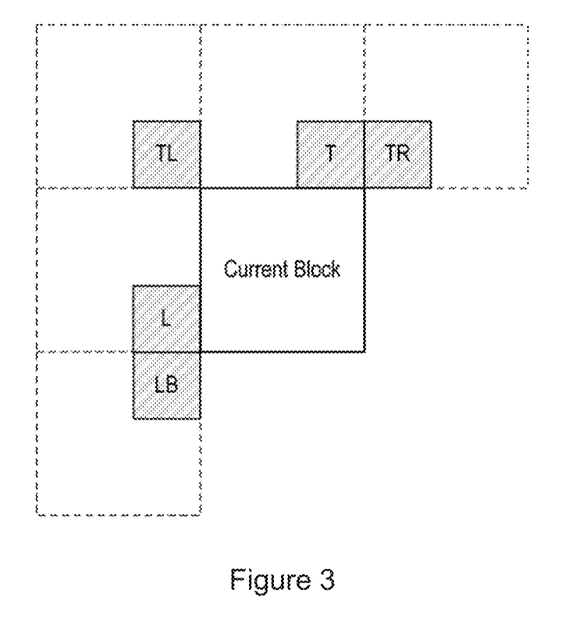
FIG. 3 shows possible spatial blocks for fetching neighboring motion information.

The block merge method is similar to the one in the previous standard HEVC. The method first generates a list of motion information candidates. The list is also referred to as merge list. The candidates are derived from previous coded blocks. The blocks can be spatially adjacent neighboring blocks or temporal collocated blocks. FIG. 3 shows possible spatial blocks for fetching neighboring motion information.

Referring to FIG. 3, the spatial neighboring blocks are left (L), top (T), top-right (TR), left-bottom (LB) and top-left (TL).

After the merge list is generated, one of the candidates inside the list is inherited to be used to derive the motion information of the current block. The candidate selection process is done on the encoder side. An encoder would select a best candidate from the list and encode an index (merge_index) in the bitstream to signal to a decoder. The decoder receives the index, it follows the same merge list derivation process as the encoder and use the index to retrieve the correct candidate.

In addition to the above-mentioned candidates, the current VVC adopted a new candidate generation method called HMVP (history-based motion vector prediction). During the encoding or decoding process, a first-in-first-out (FIFO) table is maintained. The table has a limited number (e.g., 6) of slots for storing motion information. The stored motion information is referred to as HMVP candidates.

The table is reset (i.e. all the entries are removed) before starting encoding or decoding a picture. The table is kept updated during encoding or decoding a picture. Whenever there is an inter-coded block encoded or decoded, the inter block's motion information is added to the last entry of the table as a new HMVP candidate. If there is already an identical HMVP candidate inside the table, the identical candidate is removed from the table and all the HMVP candidates afterwards are moved forward inside the table. If there is no identical HMVP candidate and the table already contains 6 HMVP candidates, the first HMVP candidate in the table is removed.

Figure 4:
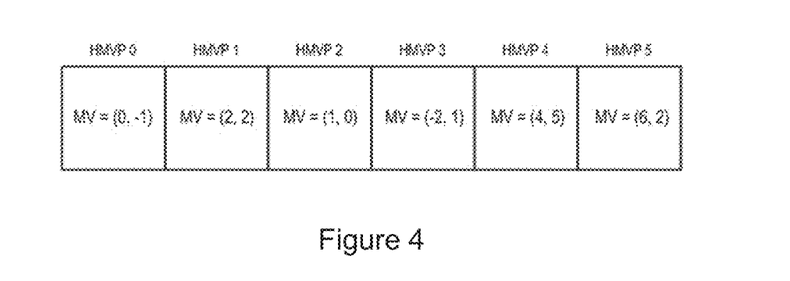
FIG. 4 shows an example of the HMVP table.

FIG. 4 shows an example of the HMVP table, where only MV is shown for simplicity and assuming all the HMVP candidates have the same RefPicListFlag and RefPicIdx, i.e. using the same reference picture.

Figure 5:
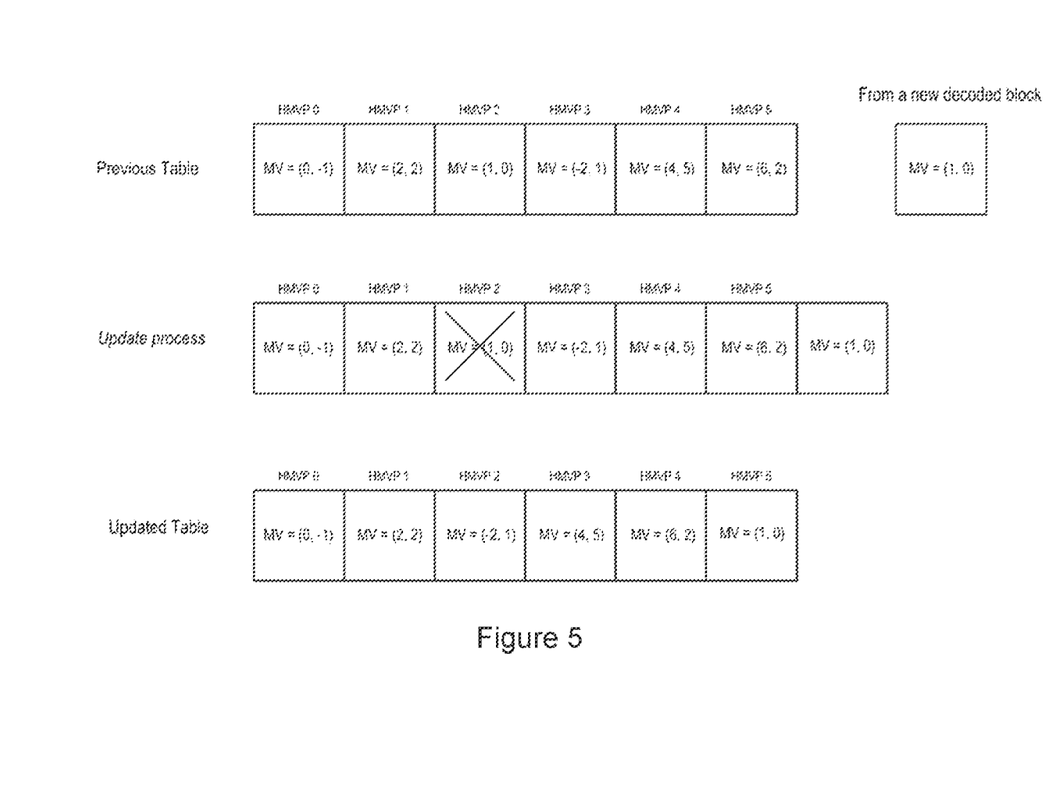
FIG. 5 illustrates example operations for HMVP table updating.

For example, when an inter block with MV=(1, 0) gets decoded, the MV is added as the last entry in the table. Since there is an identical HMVP candidate (HMVP 2) inside the table, that identical candidate is removed. FIG. 5 illustrates example operations for HMVP table updating.

The HMVP candidates inside the table are used as additional candidates for next inter block for generating the merge list.

Sub-Block Merge Method

Similarly to the block merge method, the sub-block merge method also generates a list of candidates first. The list is referred to as sub-block merge list.

After the sub-block merge list is generated, one of the candidates inside the list is used to derive the motion information of the current block. The candidate selection process is done on the encoder side. An encoder would select a best candidate from the list and encode an index (merge_index) in the bitstream to signal to a decoder. The decoder receives the index, it follows the same merge list derivation process as the encoder and uses the index to retrieve the correct candidate.

There are two types of sub-block merge candidate generation method in current VVC: affine and ATMVP (advanced temporal motion vector prediction). ATMVP is also known as subblock-based temporal motion vector prediction.

ATMVP (Subblock-Based Temporal Motion Vector Prediction)

ATMVP predicts the motion information of a block from another block in a previously decoded picture. The picture is one of the reference pictures that the current picture or slice can use. In other words, the picture should be included in the reference picture list L0 or L1 of the current picture or slice. The picture is referred to as collocated picture. The collocated picture is fixed for the current picture and there is a slice level flag to signal which reference picture is used as the collocated picture.

The ATMVP predicts the motion information of a block in two steps. The first step is to identify a corresponding block in the collocated picture with a so-called temporal vector. The second step is to split the current block into sub-blocks with size of 8×8 each and to obtain motion information for each sub-block from the corresponding block inside the collocated picture.

Figure 6:
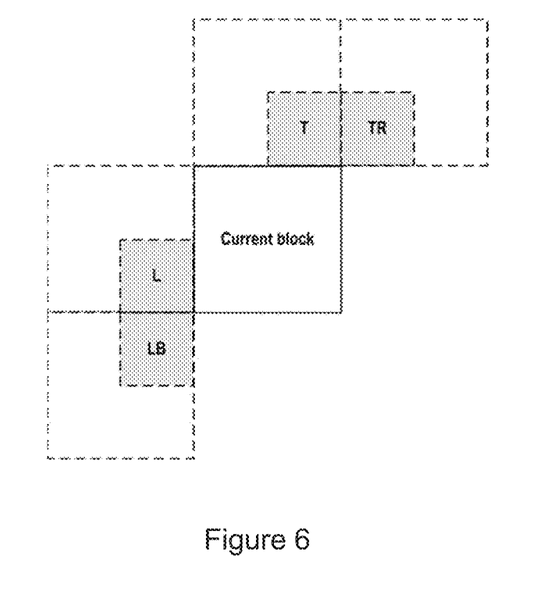
FIG. 6 illustrates operations for using spatial neighboring blocks to derive a temporal vector.

In the first step, the temporal vector is determined by the motion information of the spatial neighboring blocks of the current block. The spatial neighboring blocks may be the same as in block merge method except that the top-left (TL) block is not considered, as shown in FIG. 6. FIG. 6 illustrates operations for using spatial neighboring blocks to derive a temporal vector. Each spatial neighbor is checked in order L-T-TR-LB. The first available inter block's motion information may be chosen as the candidate for deriving the temporal vector. If the inter block use the collocated picture as the reference picture, then its motion vector is chosen as the temporal vector. If the inter block does not use the collocated picture as its reference picture, then its motion vector is not qualified to be the temporal vector and ATMVP process stops. That means the final sub-block merge list will not contain a candidate generated from the ATMVP process.

The second step is invoked only when a temporal vector is found, in accordance with some embodiments. For each sub-block, the motion information of its corresponding block (inside the collocated picture) is used to derive the motion information for the sub-block.

Figure 7:
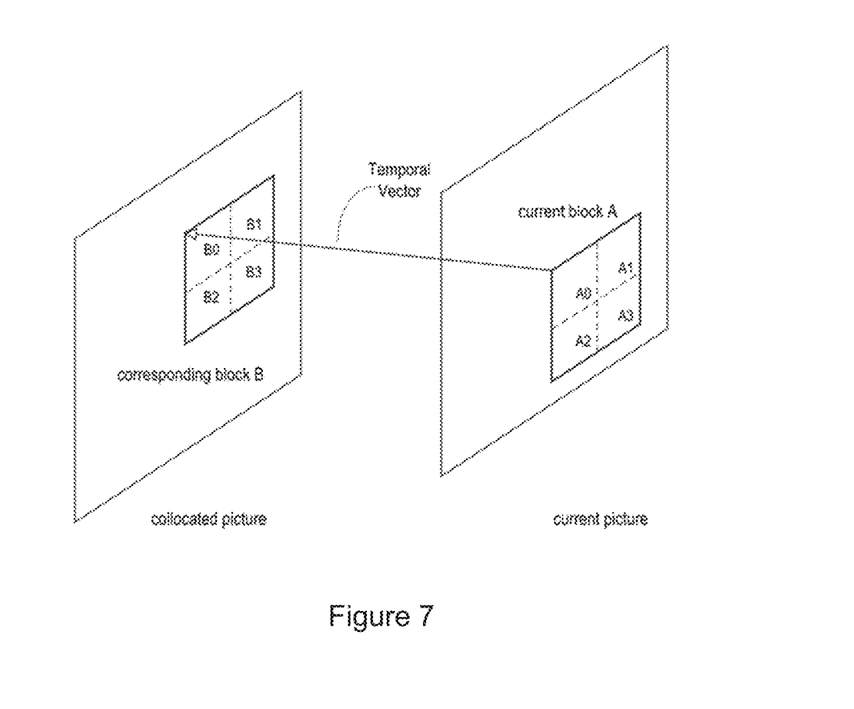
FIG. 7 shows example operations of the ATMVP process.

FIG. 7 shows example operations of the ATMVP process. The current block is A. It has size of 16×16. The ATMVP process first derives a temporal vector to identify a corresponding block B inside the collocated picture. In the second step, the block A is split into four 8×8 sub-blocks: A0, A1, A2 and A3. For each of the sub-block, it derives its motion information from the corresponding sub-block, i.e. B0, B1, B2 and B3.

Figure 8:
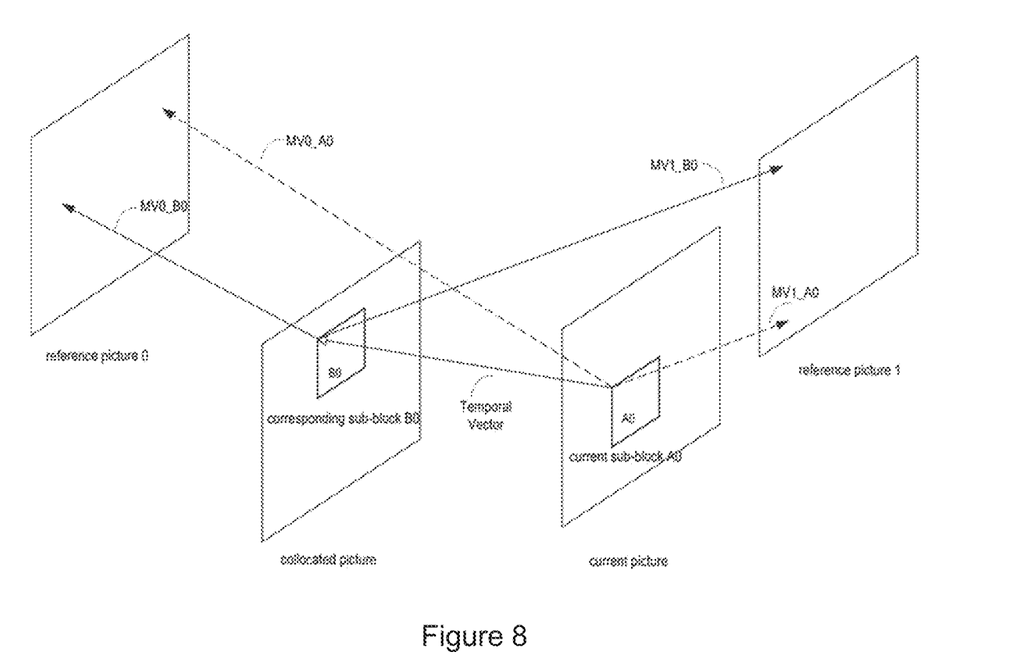
FIG. 8 shows example operations for deriving the motion information for the sub-block A0.

FIG. 8 shows example operations for deriving the motion information for the sub-block A0. The corresponding sub-block in the collocated picture is identified as B0. The B0 has motion vector MV0_B0 and MV1_B0. Those motion vectors are used to generate the motion vector MV0_A0 and MV1_A0 that A0 uses.

SUMMARY

There currently exist certain challenge(s) with the existing temporal vector derivation process in ATMVP. The process requires, in the worst case, four times a memory access to the neighboring blocks. Moreover, the process requires a number of condition checks, which include: 1) neighboring blocks availability check which checks if the neighboring block is outside of the picture boundary; and 2) coding mode check which checks if the neighboring block is an inter-coded block. Due to these drawbacks, the ATMVP's temporal vector derivation process increases the encoding or decoding latency.

Certain aspects of the present disclosure and their embodiments may provide solutions to the aforementioned challenges.

A first aspect of the embodiments defines a method for temporal motion vector prediction of a current picture in a series of pictures of a video sequence. The method comprises determining, for a current block of the current picture, whether any one of: left, top, top-right and left-bottom spatial neighboring blocks of the current block in the current picture uses a collocated picture as a reference picture. The method further comprises, when the determination is that one of the left, top, top-right and left-bottom spatial neighboring block uses a collocated picture as a reference picture, using a motion vector of the one of the spatial neighboring blocks as a temporal vector of the current block. The method may be performed by a video encoder or a video decoder.

A second aspect of the embodiments defines a device for temporal motion vector prediction of a current picture in a series of pictures of a video sequence. The device is configured to determine, for a current block of the current picture, whether any one of: left, top, top-right and left-bottom spatial neighboring blocks of the current block in the current picture uses a collocated picture as a reference picture. The device is further configured to, when the determination is that one of the left, top, top-right and left-bottom spatial neighboring block uses a collocated picture as a reference picture, use a motion vector of the one of the spatial neighboring blocks as a temporal vector of the current block. The device may be a video encoder or a video decoder.

A third aspect of the embodiments defines a network node comprising the device according to the second aspect.

A fourth aspect of the embodiments defines a computer program product comprising a non-transitory computer readable storage medium comprising computer readable program code embodied in the medium that, when executed by a processor of a picture processing circuit, causes the processor to perform operations according to the first aspect.

Certain embodiments may provide one or more of the following technical advantage(s). The following table shows the objective performance which may be obtained from the implementation of embodiment 1 and embodiment 3 explained below, although other performances may be obtained without limitation to these embodiments. The example test was carried out on top of the VVC test model VTM-3.0_rc1. The numbers in the table show the relative bit-cost for a codec under test to achieve equivalent video quality as a reference codec. The reference codec used here is VTM-3.0_rc1 as is and the codec under test is VTM-3.0_rc1 modified according to the teachings described herein. 0% means there is no bit-cost difference for the test and reference codec to achieve the same video quality. Based on the numbers, it is asserted that the simplification has marginal impact on the objective performance.

| Test sequences | Embodiment 1 | Embodiment 3 |
| --- | --- | --- |
| Class B (1080p) | 0.02% | 0.01% |
| Class C (832 × 480) | −0.02% | 0.00% |
| Class D (416 × 240) | 0.00% | −0.02% |

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment. The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Embodiment 1

According to a first embodiment, the ATMVP's temporal vector derivation process derives the temporal vector directly from the HMVP's FIFO table. In other words, one of the HMVP candidates is chosen to be the candidate for deriving the temporal vector. The preferred HMVP candidate would be the last entry inside the table which comes from the most recent decoded inter block.

If the HMVP candidate uses the collocated picture as its reference picture, then its motion vector is chosen to be the temporal vector.

If the HMVP candidate uses a reference picture different from the collocated picture, the motion vector is invalid for temporal vector and ATMVP process stops. Alternatively, a motion vector scaling process is invoked to scale the motion vector to associate with the collocated picture to become valid for the temporal vector.

One advantage compared to the existing approach is that the memory access to the neighboring block as well as condition checks can be completely avoided.

Figure 9:
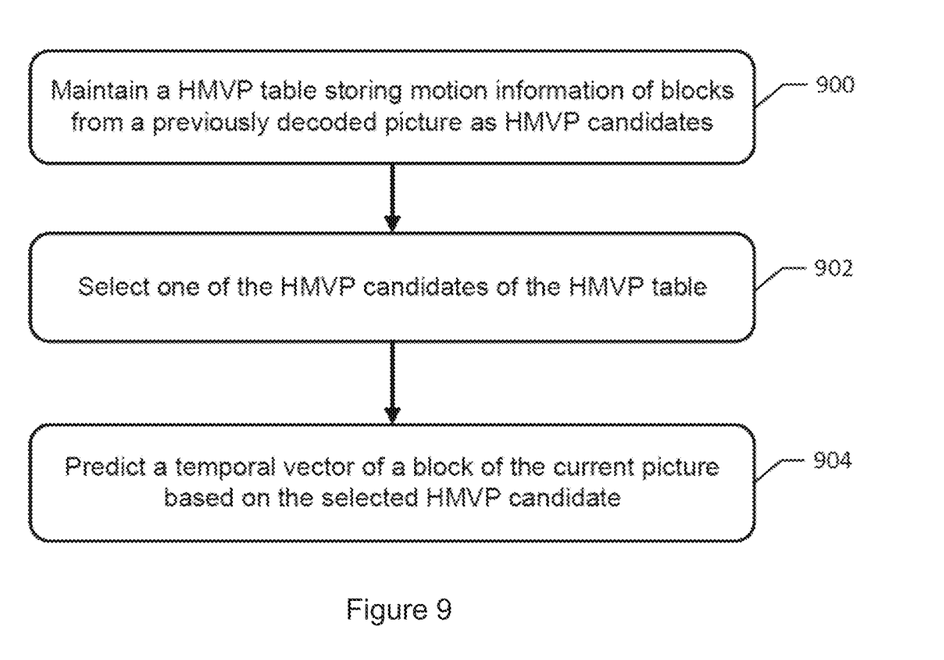
FIG. 9 is a flowchart of corresponding operations that may be performed by a picture decoding circuit or by a picture encoding circuit for ATMVP of a current picture in a series of pictures of a video sequence, in accordance with some embodiments.

FIG. 9 is a flowchart of corresponding operations that may be performed by a picture decoding circuit or by a picture encoding circuit for ATMVP of a current picture in a series of pictures of a video sequence. The operations of FIG. 9 may more generally be performed by a picture processing circuit, which may be a picture decoder circuit and/or a picture encoder circuit. Referring to FIG. 9, the operations include maintaining (900) a history-based motion vector prediction, HMVP table storing motion information from previously decoded inter blocks as HMVP candidates, where the inter blocks are from a same previously decoded picture or from a plurality of previously decoded or encoded pictures. The operations may further select (902) one of the HMVP candidates of the HMVP table. The operations may further predict (904) a temporal vector of a block of the current picture based on the selected HMVP candidate.

In a further embodiment, the operation to select (902) one of the HMVP candidates includes selecting an entry of the HMVP table that came from a most recently decoded or encoded inter block.

Operations may further include determining whether the selected HMVP candidate uses a collocated picture as a reference picture. When the determination is that the selected HMVP candidate uses a collocated picture as a reference picture, the operations use a motion vector of the selected HMVP candidate as the temporal vector. In one further embodiment, when the determination is that the selected HMVP candidate uses a reference picture that is different from the collocated picture, the operations determine that the motion vector is invalid for prediction of the temporal vector and cease the ATMVP of the block of the current picture.

In alternative further embodiment, when the determination is that the selected HMVP candidate uses a reference picture that is different from the collocated picture, the operations perform a motion vector scaling operation that scales the motion vector to associate with the collocated picture, and use the scaled motion vector for prediction of the temporal vector.

Embodiment 2

Operations according to a second embodiment can be as described for Embodiment 1, but instead of only checking one of the HMVP candidates, a scanning process is introduced to check more than one HMVP candidate. One option would be to check all the HMVP candidates inside the FIFO table in order. The process stops when a candidate uses the collocated picture as its reference picture. The candidate's motion vector is chosen to be the temporal vector.

If no candidate is found which uses the collocated picture as the reference picture, then ATMVP process stops. Alternatively, a motion vector scaling process is invoked to scale the motion vector from one HMVP candidate to associate with the collocated picture to become valid for the temporal vector. In one variant the motion scaling process is invoked if no candidate uses the collocated picture as the reference picture and the motion scaling process is invoked for the last entry in the table which comes from the most recent decoded inter block.

With continued reference to FIG. 9, the corresponding operation to select (902) one of the HMVP candidates of the HMVP table can include a scanning operation that scans the HMVP candidates in a defined order in the HMVP table to select one of the HMVP candidates that is determined to use the collocated picture as its reference picture. The selection (902) of one of the HMVP candidates may include scanning the HMVP candidates in the order that the HMVP candidates occur in the HMVP table to select the first one of the HMVP candidates that is determined to use the collocated picture as its reference picture. In a further embodiment, the motion vector of the selected one of the HMVP candidates is used as the temporal vector.

In a further embodiment, when the scanning determines that none of the HMVP candidates uses the collocated picture as the reference picture, the operations determine that the motion vectors from the HMVP candidates are invalid for prediction of the temporal vector and cease the ATMVP of the block of the current picture.

In an alternative further embodiment, when the scanning determines that none of the HMVP candidates uses the collocated picture as the reference picture, the operations perform a motion vector scaling operation that scales the motion vector from one of the HMVP candidates to associate with the collocated picture and using the scaled motion vector for prediction of the temporal vector. The operations may select an entry from the HMVP table that corresponds to the most recently decoded or encoded inter block for the motion vector scaling operation.

Embodiment 3

A third embodiment uses the existing temporal vector derivation process but with a restriction on the maximum number of memory access to neighboring blocks.

A preferred maximum number is 1. The derivation process checks at most one of the neighboring blocks. For example, it only checks the left (L) neighboring block, as shown in FIG. 6.

When the inter block is determined to use the collocated picture as its reference picture, then its motion vector is chosen to be the temporal vector.

In contrast, when the inter block is determined to use a reference picture different from the collocated picture, the motion vector is invalid for temporal vector and subblock-based temporal motion vector prediction (ATMVP) process stops. In an alternative embodiment, when the inter block is determined to use a reference picture different from the collocated picture, a motion vector scaling process is invoked to scale the inter block's motion vector to associate with the collocated picture to become valid for the temporal vector. The corresponding operations may perform a motion vector scaling operation that scales the motion vector to associate with the collocated picture and use the scaled motion vector for prediction of the temporal vector.

Figure 12:
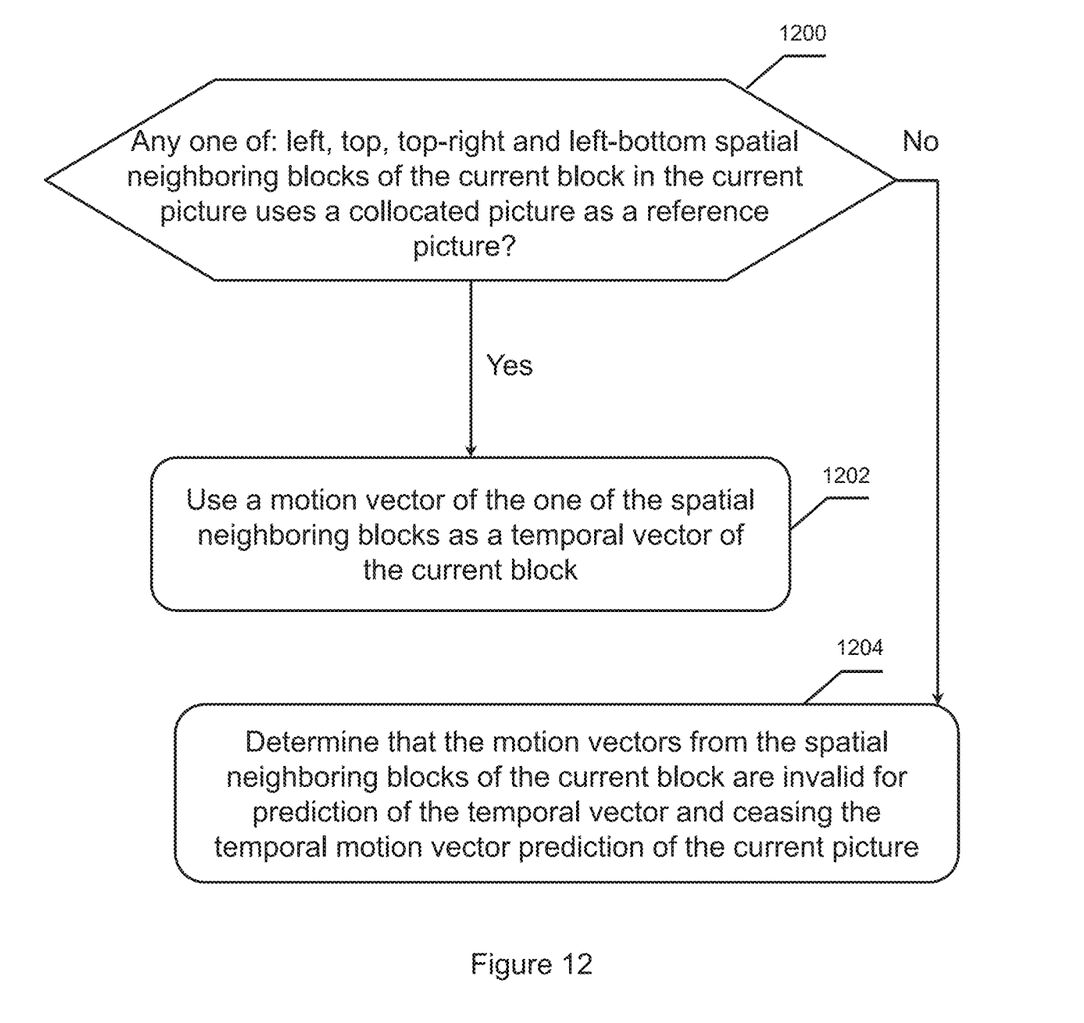
FIGS. 12 and 13 are flowcharts of corresponding operations that may be performed by a picture decoding circuit or by a picture encoding circuit for ATMVP of a current picture in a series of pictures of a video sequence, in accordance with some embodiments.

FIG. 12 is a flowchart of operations that may be performed by a video decoder (picture decoding circuit) or by a video encoder (picture encoding circuit) for ATMVP of a current picture in a series of pictures of a video sequence. The operations of FIG. 12 may more generally be performed by a video processor (picture processing circuit), which may be a video decoder (picture decoder circuit) and/or a video encoder (picture encoder circuit). Referring to FIG. 12, the operations include, for a current block of the current picture, determining (1200) whether any one of left, top, top-right and left-bottom spatial neighboring blocks of the current block in the current picture uses a collocated picture as a reference picture. The operations further include, when the determination is that one of the spatial neighboring block uses a collocated picture as a reference picture, using (1202) a motion vector of the one of the spatial neighboring blocks as a temporal vector of the current block.

The determination (1200) of whether any one of left, top, top-right and left-bottom neighboring blocks of the current block in the current picture uses a collocated picture as a reference picture, may be constrained to performing the determination for only a single spatial neighboring block of the current block in the current picture. The single spatial neighboring block may be selected as a left neighboring block of the current block in the current picture.

The operations may further include, when the determination (1200) is that none of left, top, top-right and left-bottom spatial neighboring blocks of the current block in the current picture uses a collocated picture as a reference picture, determining (1204) that the motion vectors from the spatial neighboring blocks of the current block are invalid for prediction of the temporal vector and ceasing the ATMVP of the current block of the current picture.

The operations may further include, when the determination (1200) is that none of left, top, top-right and left-bottom spatial neighboring blocks of the current block in the current picture uses a collocated picture as a reference picture, performing a motion vector scaling operation that scales the motion vector from one of the spatial neighboring candidates to associate with the collocated picture and using the scaled motion vector for prediction of the temporal vector.

Embodiment 4

Previously known ATMVP processes determine the temporal vector on a block by block basis.

A fourth embodiment derives a temporal vector before starting encoding or decoding of the current picture or slice. The same temporal vector is used for blocks that uses ATMVP inside the current picture or slice.

In one embodiment, the operations use the most commonly used motion vector in the previous decoded picture or slice as the temporal vector. In another embodiment, a motion vector scaling process is performed to scale the motion vector to associate with the collocated picture to become valid for the temporal vector.

Embodiment 5

A fifth embodiment derives a temporal vector before starting encoding or decoding of a group of blocks. A further embodiment, the operation for block grouping is to group blocks in the same row inside a picture. For each group, the same temporal vector is used.

One further embodiment uses the most commonly used motion vector in the previous group as the temporal vector of the current group. Alternatively, a motion vector scaling process is used to scale the motion vector to associate with the collocated picture to become valid for the temporal vector.

Embodiment 6

A sixth embodiment uses a fixed temporal vector for the entire sequence. The temporal vector can be signaled in the sequence parameter set.

Figure 13:
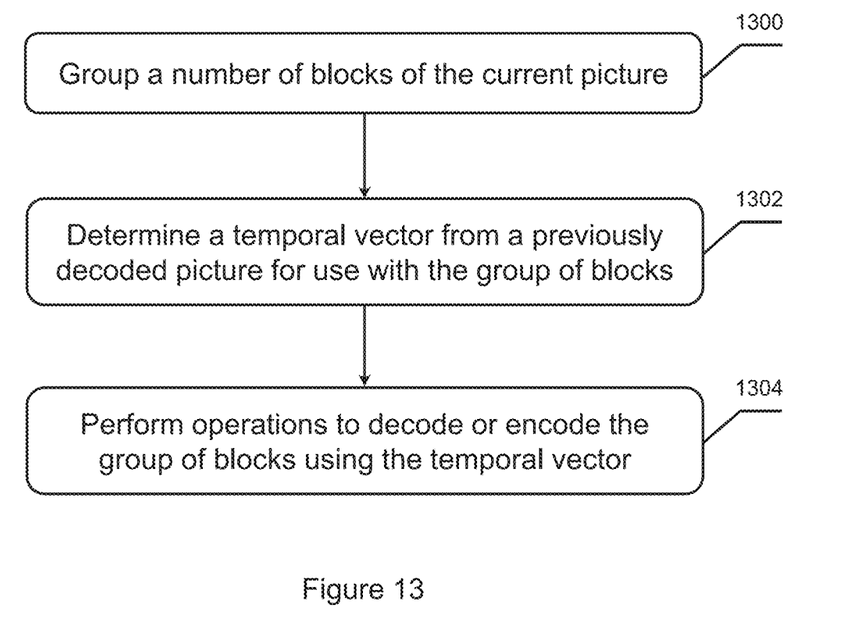

FIG. 13 is a flowchart of operations that may be performed by a video decoder (picture decoding circuit) or by a video encoder (picture encoding circuit) for ATMVP of a current picture in a series of pictures of a video sequence according to any one or more of Embodiment 4, Embodiment 5, and Embodiment 6. The operations of FIG. 13 may more generally be performed by a video processor (picture processing circuit), which may be a video decoder (picture decoder circuit) and/or a video encoder (picture encoder circuit).

Referring to FIG. 13, the operations include grouping (1300) a number of blocks of the current picture, and determining (1302) a temporal vector from a previously decoded picture for use with the group of blocks. The operations further include performing (1304) operations to decode or encode the group of blocks using the temporal vector.

The operations may further include determining a temporal vector for use with the group of blocks of the current picture based on motion vectors from another group of blocks in the current picture or previously decoded picture, and performing operations to decode or encode the group of blocks of the current picture using the temporal vector.

The operation to group (1300) a number of blocks of the current picture may operate to group blocks that are in the same row in the current picture into a same group.

The operation to group (1300) a number of blocks of the current picture may operate to group blocks in the same picture in a same group.

The operation to group (1300) a number of blocks of the current picture may operate to group all blocks of a sequence of pictures into a same group.

The operations to decode or encode (1304) the group of blocks using the temporal vector can further include performing operations to decode or encode all blocks of the current picture using the temporal vector.

The operations to decode or encode (1304) the group of blocks using the temporal vector can further include performing operations to decode or encode all blocks of a sequence of pictures that includes the current picture using the temporal vector.

When performed by a picture encoding circuit, the operations can include signaling an indication of the temporal vector in a sequence parameter set for the current picture. The signaling may include embedding the indication of the temporal vector in a header field for the series of pictures of the video sequence.

Figure 10:
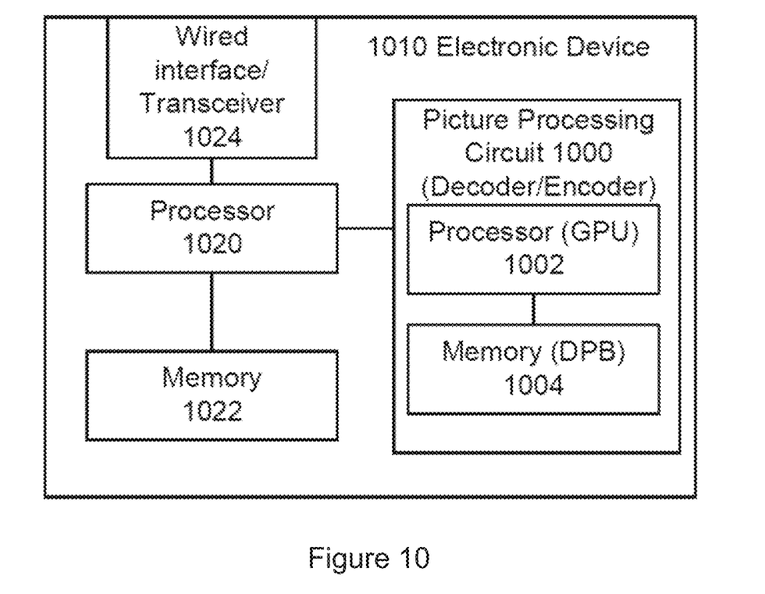
FIG. 10 is a block diagram illustrating an electronic device having a picture processing circuit that is configured according to some embodiments.

When performed by a picture decoding circuit, the operations can include determining the temporal vector based on an indication of the temporal vector in a sequence parameter set that is received for the current picture. The temporal vector may be determined based on the indication contained in a header field for the series of pictures of the video sequence Example Video Decoder (Picture Decoder Circuit), Electronic Device, and Network Node FIG. 10 is a block diagram illustrating an electronic device 1010 having a picture processing circuit 1000 that is configured according to some embodiments. The picture processing circuit 1000 may be a video decoder (picture decoder circuit) and/or a video encoder (picture encoder circuit). The electronic device 1010 can include, without limitation, a wireless terminal, a wireless communication device, a wireless communication terminal, a UE node/terminal/device, gaming console, video media player, etc. The electronic device 1010 may be configured to provide wired and/or wireless communications. When configured for wireless communications, the electronic device 1010 includes an antenna and a transceiver circuit 1024 (also referred to as a transceiver) including a transmitter and a receiver configured to provide uplink and downlink radio communications with other electronic devices and/or a radio access network RAN node (e.g., a base station, eNB, gNB, network node, etc.) of a wireless communication network. Alternatively or additionally, the electronic device 1010 may include a wired interface 1024 configured for communications via a wire line with other electronic devices and/or network nodes. The electronic device 1010 further includes a processor circuit 1020 (also referred to as a processor) coupled to the interface 1024, and a memory circuit 1022 (also referred to as memory) coupled to the processor circuit 1020. The processor 1020 is also coupled to the picture processing circuit 1000 which includes a processor 1002 (e.g., a graphics processing unit) coupled to a memory 1004 which can store a current picture in a series of pictures of a video sequence for encoding and/or decoding in accordance with any one or more of the embodiments disclosed herein. The memory 1022 stores computer readable program code that when executed by the processor 1020 causes the processor 1020 to perform operations according to any one or more of the embodiments disclosed herein. According to other embodiments, the picture processing circuit 1000 may be implemented as an application specific integrated circuit or other picture decoding circuit, and the operations thereof may be at least partially or entirely performed by the processor 1020 executing operations from the memory 1022. The electronic device 1010 may receive a series of pictures of a video sequence from another UE, network node, removable memory device, a camera, etc, for decoding. The electronic device 1010 may encode a series of pictures of a video sequence that is provided to another UE, network node, a removable memory device, etc.

Figure 11:
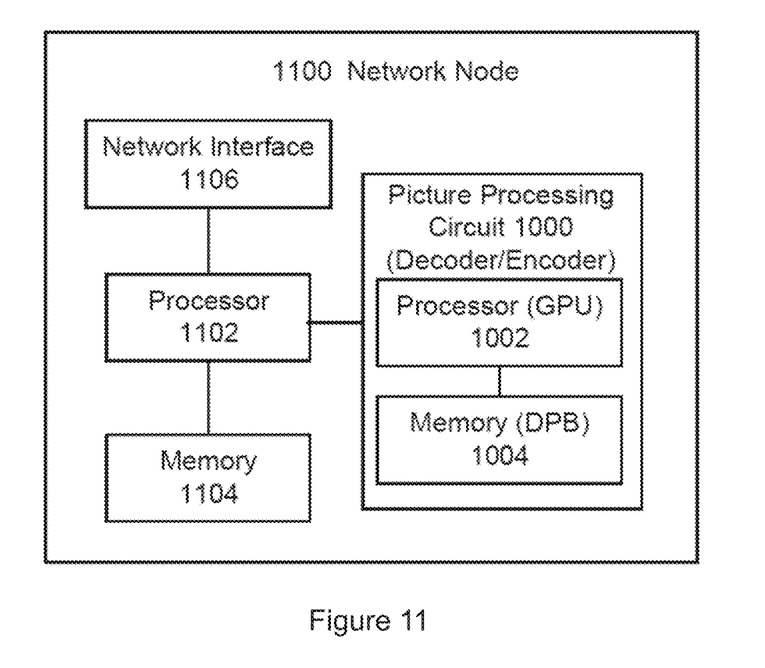
FIG. 11 is a block diagram illustrating a network node having the picture processing circuit that is configured according to some embodiments.

FIG. 11 is a block diagram illustrating a network node 1100 having the picture processing circuit 1000 that is configured according to some embodiments. The network node 1100 can include, without limitation, a video encoder node, a video decoder node, a webserver computer, a video server, a base station, eNB, gNB, etc. As shown, the network node 1100 includes a network interface 1106 (e.g., wired network interface and/or wireless network interface) coupled to a processor circuit 1102 (also referred to as a processor), and a memory circuit 1104 (also referred to as memory) coupled to the processor 1102. The processor 1102 is also coupled to the picture processor circuit 1000 which may be configured to operate as described above for FIG. 10 and/or according to other embodiments herein. As explained above, operations of the picture processor circuit 1000 may be at least partially integrated within the processor 1102 and memory 1104 and/or may be at least partially performed by an ASIC.

The invention claimed is:

1. A method for temporal motion vector prediction of a current picture in a series of pictures of a video sequence, the method comprising:
   determining, for a current block of the current picture, whether any one of: left, top, top-right and left-bottom spatial neighboring blocks of the current block in the current picture uses a collocated picture as a reference picture;
   using a motion vector of the one of the spatial neighboring blocks as a temporal vector of the current block, when the determination is that one of the left, top, top-right and left-bottom spatial neighboring block uses a collocated picture as a reference picture; and
   wherein the determining whether any one of: left, top, top-right and left-bottom spatial neighboring blocks of the current block in the current picture uses a collocated picture as a reference picture is performed by checking only the left spatial neighboring block of the current block in the current picture without reference to any listing of spatial neighboring blocks in any merge list.

2. The method of claim 1, further comprising:
   determining that the motion vectors from the spatial neighboring blocks of the current block are invalid for prediction of the temporal vector and ceasing the temporal motion vector prediction of the current block of the current picture, when the determination is that the left spatial neighboring block of the current block in the current picture does not use a collocated picture as a reference picture.

3. The method of claim 1, further comprising:
   performing a motion vector scaling operation that scales the motion vector from one of the spatial neighboring candidates to associate with the collocated picture and using the scaled motion vector for prediction of the temporal vector, when the determination is that the left spatial neighboring block of the current block in the current picture does not use a collocated picture as a reference picture.

4. The method of claim 1, wherein the method is performed by a video decoder.

5. The method of claim 1, wherein the method is performed by a video encoder.

6. A device for temporal motion vector prediction of a current picture in a series of pictures of a video sequence, the device comprising:
   a processor; and
   a memory coupled to the processor, wherein the memory stores instructions that when executed by the processor causes the processor to perform operations according to claim 1.

7. A device for temporal motion vector prediction of a current picture in a series of pictures of a video sequence, configured to:
   determine, for a current block of the current picture, whether any one of: left, top, top-right and left-bottom spatial neighboring blocks of the current block in the current picture uses a collocated picture as a reference picture;
   use a motion vector of the one of the spatial neighboring blocks as a temporal vector of the current block, when the determination is that one of the left, top, top-right and left-bottom spatial neighboring block uses a collocated picture as a reference picture;
   wherein the device is further configured to perform the determination for only a single spatial neighboring block of the current block in the current picture without reference to any listing of spatial neighboring blocks in any merge list; and
   wherein the single spatial neighboring block is a left neighboring block of the current block in the current picture.

8. The device according to claim 7, further configured to:
   determine that the motion vectors from the spatial neighboring blocks of the current block are invalid for prediction of the temporal vector and cease the temporal motion vector prediction of the current block of the current picture, when the determination is that none of the left, top, top-right and left-bottom spatial neighboring blocks of the current block in the current picture uses a collocated picture as a reference picture.

9. The device according to claim 7, further configured to:
perform a motion vector scaling operation that scales the motion vector from one of the spatial neighboring candidates to associate with the collocated picture and use the scaled motion vector for prediction of the temporal vector, when the determination is that none of the left, top, top-right and left-bottom spatial neighboring blocks of the current block in the current picture uses a collocated picture as a reference picture.

10. The device according to claim 7 wherein the device is a video decoder.

11. The device according to claim 7 wherein the device is a video encoder.

12. A network node comprising the device according to claim 6.

* * * * *

UNITED STATES PATENT AND TRADEMARK OFFICE
CERTIFICATE OF CORRECTION

PATENT NO. : 12,003,702 B2  
APPLICATION NO. : 17/846123  
DATED : June 4, 2024  
INVENTOR(S) : Yu et al.

Page 1 of 1

It is certified that error appears in the above-identified patent and that said Letters Patent is hereby corrected as shown below:

In the Specification

Column 1, Line 10, delete "2020," and insert -- 2020, now U.S. Pat. No. 11,381,807, --, therefor.

Column 5, Line 44, delete "VTM-3.0_rcl." and insert -- VTM-3.0_rc1. --, therefor.

Column 5, Line 47, delete "VTM-3.0_rcl" and insert -- VTM-3.0_rc1 --, therefor.

Column 5, Lines 47-48, delete "VTM-3.0_rcl" and insert -- VTM-3.0_rc1 --, therefor.

Signed and Sealed this  
Seventeenth Day of September, 2024

Katherine Kelly Vidal  
*Director of the United States Patent and Trademark Office*